United States Patent
Jang et al.

(10) Patent No.: US 10,106,687 B2
(45) Date of Patent: Oct. 23, 2018

(54) COMPOSITION FOR FORMING SILICA LAYER, METHOD FOR MANUFACTURING SILICA LAYER AND SILICA LAYER

(71) Applicant: SAMSUNG SDI CO., LTD., Yongin-si, Gyeonggi-do (KR)

(72) Inventors: Junyoung Jang, Suwon-si (KR); Huichan Yun, Suwon-si (KR); Woo Han Kim, Suwon-si (KR); Kunbae Noh, Suwon-si (KR); Eunseon Lee, Suwon-si (KR); Taeksoo Kwak, Suwon-si (KR); Jingyo Kim, Suwon-si (KR); Haneul Kim, Suwon-si (KR); Yoong Hee Na, Suwon-si (KR); Jin-Hee Bae, Suwon-si (KR); Jinwoo Seo, Suwon-si (KR); Byeonggyu Hwang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/061,670

(22) Filed: Mar. 4, 2016

(65) Prior Publication Data

US 2017/0029624 A1 Feb. 2, 2017

(30) Foreign Application Priority Data

Jul. 31, 2015 (KR) ........................ 10-2015-0109028

(51) Int. Cl.
| | | |
|---|---|---|
| C09D 183/08 | (2006.01) | |
| C09D 1/00 | (2006.01) | |
| C09D 7/00 | (2018.01) | |
| C01B 33/12 | (2006.01) | |
| H01L 21/02 | (2006.01) | |
| C09D 7/20 | (2018.01) | |
| C09D 183/16 | (2006.01) | |

(52) U.S. Cl.
CPC ................ C09D 1/00 (2013.01); C01B 33/12 (2013.01); C09D 7/001 (2013.01); C09D 7/20 (2018.01); H01L 21/02123 (2013.01); H01L 21/02282 (2013.01); C09D 183/08 (2013.01); C09D 183/16 (2013.01)

(58) Field of Classification Search
CPC ....... C09D 7/20; C09D 183/08; C09D 183/16
USPC .......................................................... 528/38
See application file for complete search history.

(56) References Cited

U.S. PATENT DOCUMENTS

| | | | | |
|---|---|---|---|---|
| 3,170,962 A * | 2/1965 | Tyler | ................... | C08G 59/4085 525/476 |
| 3,453,304 A * | 7/1969 | Selin | ..................... | C07F 7/0874 528/14 |
| 3,758,624 A | 9/1973 | Perilstein | | |
| 4,975,512 A * | 12/1990 | Funayama | ............. | C04B 35/589 525/474 |
| 4,992,108 A | 2/1991 | Ward et al. | | |
| 5,151,390 A | 9/1992 | Aoki et al. | | |
| 5,354,506 A * | 10/1994 | Niebylski | ............. | C04B 35/589 252/389.31 |
| 5,459,114 A | 10/1995 | Kaya et al. | | |
| 5,688,864 A * | 11/1997 | Goodwin | ............... | C03C 17/009 106/287.14 |
| 5,747,623 A * | 5/1998 | Matsuo | .................. | C03C 17/007 525/474 |
| 6,200,947 B1 | 3/2001 | Takashima et al. | | |
| 6,359,096 B1 * | 3/2002 | Zhong | ..................... | C08G 77/02 106/287.14 |
| 6,413,202 B1 | 7/2002 | Leonte et al. | | |
| 6,451,955 B1 * | 9/2002 | Hausladen | ......... | C08G 73/1032 525/420 |
| 6,767,641 B1 | 7/2004 | Shimizu et al. | | |
| 8,058,711 B2 | 11/2011 | Lim et al. | | |
| 8,252,101 B1 | 8/2012 | Glemba et al. | | |
| 8,372,479 B2 * | 2/2013 | Di Loreto | ............. | F27D 1/1642 427/226 |
| 2002/0015851 A1 * | 2/2002 | Higuchi | ............... | C08K 5/3492 428/447 |
| 2002/0160614 A1 | 10/2002 | Cho et al. | | |
| 2003/0092565 A1 | 5/2003 | Chaudhari et al. | | |
| 2003/0105264 A1 | 6/2003 | Bedwell et al. | | |
| 2004/0013858 A1 | 1/2004 | Hacker et al. | | |
| 2004/0224537 A1 | 11/2004 | Lee et al. | | |
| 2005/0026443 A1 | 2/2005 | Goo et al. | | |
| 2005/0181566 A1 | 8/2005 | Machida et al. | | |
| 2005/0238392 A1 | 10/2005 | Okamoto et al. | | |
| 2007/0049616 A1 | 3/2007 | Ksander et al. | | |
| 2007/0161530 A1 | 7/2007 | Kaneda et al. | | |
| 2008/0102211 A1 * | 5/2008 | Matsuo | .................. | C09D 7/001 427/340 |
| 2008/0234163 A1 * | 9/2008 | Shimizu | ..................... | C08J 7/02 510/175 |
| 2010/0139697 A1 | 6/2010 | Martens et al. | | |
| 2010/0167535 A1 | 7/2010 | Nishiwaki et al. | | |
| 2012/0034767 A1 | 2/2012 | Xiao et al. | | |
| 2012/0064722 A1 | 3/2012 | Sakurai | | |
| 2012/0164382 A1 | 6/2012 | Yun et al. | | |
| 2012/0177829 A1 | 7/2012 | Lim et al. | | |
| 2012/0263867 A1 * | 10/2012 | Kanbe | ................ | H01L 51/0005 427/66 |

(Continued)

FOREIGN PATENT DOCUMENTS

| | | |
|---|---|---|
| CN | 1260811 A | 7/2000 |
| CN | 101679923 A | 3/2010 |

(Continued)

OTHER PUBLICATIONS

TIPO Search Report dated Sep. 7, 2016, for corresponding Taiwanese Patent Application No. 105108604 (1 page).

(Continued)

*Primary Examiner* — Margaret G Moore
(74) *Attorney, Agent, or Firm* — Lewis Roca Rothgerber Christie LLP

(57) ABSTRACT

A composition for forming a silica layer includes a silicon-containing polymer and a mixed solvent including at least two solvents, wherein the mixed solvent has a surface tension of about 5 mN/m to about 35 mN/m at a temperature of about 25° C.

12 Claims, No Drawings

(56) References Cited

U.S. PATENT DOCUMENTS

| | | |
|---|---|---|
| 2013/0017662 A1 | 1/2013 | Park et al. |
| 2013/0252869 A1 | 9/2013 | Oh et al. |
| 2013/0323904 A1 | 12/2013 | Takano et al. |
| 2014/0057003 A1 | 2/2014 | Johnson |
| 2014/0099510 A1 | 4/2014 | Chiong et al. |
| 2014/0099554 A1* | 4/2014 | Inoue ............... H01G 9/042 429/231.8 |
| 2014/0106576 A1* | 4/2014 | Morita ............. C08G 77/62 438/787 |
| 2014/0120352 A1* | 5/2014 | Miyahara ......... G03G 15/2025 428/422 |
| 2014/0315367 A1 | 10/2014 | Bae et al. |
| 2015/0093545 A1 | 4/2015 | Han et al. |
| 2015/0234278 A1 | 8/2015 | Hatakeyama et al. |
| 2016/0315286 A1* | 10/2016 | Kuroki ............. H01L 51/5215 |

FOREIGN PATENT DOCUMENTS

| | | |
|---|---|---|
| CN | 101111575 B | 6/2010 |
| CN | 102153951 A | 8/2011 |
| CN | 102569060 A | 7/2012 |
| CN | 102874813 A | 1/2013 |
| CN | 103380487 A | 10/2013 |
| CN | 103582559 A | 2/2014 |
| CN | 103910885 A | 7/2014 |
| JP | 5-148720 A | 6/1993 |
| JP | 05-243223 A | 9/1993 |
| JP | 10-046108 A | 2/1998 |
| JP | 10-194826 A | 7/1998 |
| JP | 10-321719 A | 12/1998 |
| JP | 2001-308090 A | 11/2001 |
| JP | 2003-197611 A | 7/2003 |
| JP | 2004-96076 A | 3/2004 |
| JP | 2004-331733 A | 11/2004 |
| JP | 3760028 B2 | 3/2006 |
| JP | 2006-253310 A | 9/2006 |
| JP | 3912697 B2 | 2/2007 |
| JP | 4101322 B2 | 3/2008 |
| JP | 2008-088224 A | 4/2008 |
| JP | 2008-305974 A | 12/2008 |
| JP | 4349390 B2 | 10/2009 |
| JP | 2010-59280 A | 3/2010 |
| JP | 2010-61722 A | 3/2010 |
| JP | 2010-177647 A | 8/2010 |
| JP | 2011-142207 A | 7/2011 |
| JP | 2012-983 A | 1/2012 |
| JP | 2012-94739 A | 5/2012 |
| JP | 5250813 82 | 7/2013 |
| JP | 2015-58687 A | 3/2015 |
| JP | 2015-512561 A | 4/2015 |
| JP | 5691175 B2 | 4/2015 |
| KR | 2001-0006446 A | 1/2001 |
| KR | 10-2002-0025680 A | 4/2002 |
| KR | 10-0364026 B1 | 12/2002 |
| KR | 10-0397174 B1 | 9/2003 |
| KR | 10-0464859 B1 | 1/2005 |
| KR | 10-2005-0056872 A | 6/2005 |
| KR | 10-0503527 B1 | 7/2005 |
| KR | 10-2005-0084617 A | 8/2005 |
| KR | 10-2005-0104610 A | 11/2005 |
| KR | 10-0611115 81 | 8/2006 |
| KR | 10-2006-0134098 A | 12/2006 |
| KR | 10-2007-0028518 A | 3/2007 |
| KR | 10-2007-0108214 A | 11/2007 |
| KR | 10-0859276 B1 | 9/2008 |
| KR | 10-2010-0138997 | 12/2010 |
| KR | 10-2011-0006586 A | 1/2011 |
| KR | 10-2011-0012574 A | 2/2011 |
| KR | 10-2011-0023411 A | 3/2011 |
| KR | 10-2011-0062158 A | 6/2011 |
| KR | 10-2011-0073176 A | 6/2011 |
| KR | 10-2011-0081043 A | 7/2011 |
| KR | 10-1142369 B1 | 5/2012 |
| KR | 10-2012-0071311 A | 7/2012 |
| KR | 10-2013-0064026 | 6/2013 |
| KR | 10-2013-0064066 A | 6/2013 |
| KR | 10-1332306 B1 | 11/2013 |
| KR | 10-2013-0137596 | 12/2013 |
| KR | 10-2014-0011506 A | 1/2014 |
| KR | 10-2014-0063518 | 5/2014 |
| KR | 10-2014-0085119 A | 7/2014 |
| KR | 10-2014-0085264 A | 7/2014 |
| KR | 10-2014-0087644 A | 7/2014 |
| KR | 10-2014-0087998 | 7/2014 |
| KR | 10-2014-0087998 A | 7/2014 |
| KR | 10-2014-0125203 A | 10/2014 |
| KR | 10-2014-0127313 A | 11/2014 |
| KR | 10-2014-0139946 | 12/2014 |
| KR | 10-2015-0019949 A | 2/2015 |
| KR | 10-2015-0039084 | 4/2015 |
| KR | 10-2015-0039084 A | 4/2015 |
| TW | 200946453 A1 | 11/2009 |
| TW | 201132716 A1 | 10/2011 |
| TW | 201233741 A1 | 8/2012 |
| TW | 201439685 A | 10/2014 |
| TW | 201441365 A | 11/2014 |
| TW | 201522508 A | 6/2015 |

OTHER PUBLICATIONS

Machine English Translation of JP 3912697 B2, dated Feb. 9, 2007, 11 Pages.
Machine English Translation of JP 4101322 B2, dated Mar. 28, 2008, 9 Pages.
Korean Patent Abstracts for Korean Publication No. 1020040068989 A, Corresponding to Korean Patent No. 10-0859276 B1, dated Sep. 19, 2008, 1 Page.
TIPO Search Report dated Nov. 9, 2015, for corresponding Taiwanese Patent Application No. 104117087, (1 page).
TIPO Search Report dated Aug. 2, 2016, for corresponding Taiwanese Patent Application No. 104125161 (1 page).
TIPO Search Report dated May 24, 2016, for corresponding Taiwanese Patent Application No. 104129710 (1 page).
Partial English Translation of relevant parts of TW 201441365 A dated Nov. 1, 2014, listed above.
U.S. Office Action dated Mar. 24, 2016, for cross-reference U.S. Appl. No. 14/720,674 (13 pages).
U.S. Office Action dated Jun. 17, 2016, for cross-reference U.S. Appl. No. 14/488,440 (7 pages).
U.S. Office Action dated Aug. 12, 2016, for cross-reference U.S. Appl. No. 14/842,632 (9 pages).
U.S. Office Action dated Aug. 18, 2016, for cross-reference U.S. Appl. No. 14/754,346 (11 pages).
U.S. Office Action dated Sep. 8, 2016, for cross-reference U.S. Appl. No. 14/720,674 (24 pages).
U.S. Office Action dated Nov. 14, 2016, for cross-reference U.S. Appl. No. 14/488,440 (10 pages).
U.S. Office Action dated Jan. 20, 2017, for cross reference U.S. Appl. No. 14/842,632 (7 pages).
U.S. Office Action dated Mar. 2, 2017, for cross reference U.S. Appl. No. 14/754,346 (9 pages).
KIPO Office Action dated May 1, 2017, for corresponding Korean Patent Application No. 10-2014-0184766 (5 pages).
U.S. Advisory Action dated May 8, 2017, issued in cross-reference U.S. Appl. No. 14/754,346 (5 pages).
U.S. Office Action dated Jun. 21, 2017, issued in cross-reference U.S. Appl. No. 14/754,346 (8 pages).
U.S. Office Action dated Mar. 7, 2017, issued in cross-reference U.S. Appl. No. 14/839,642 (10 pages).
U.S. Office Action dated Jun. 20, 2017, issued in cross-reference U.S. Appl. No. 14/839,642 (10 pages).
SIPO Office Action dated Aug. 2, 2017, corresponding to Chinese Patent Application No. 201510591897.4 (8 pages).
U.S. Office Action dated Aug. 1, 2017, issued in cross-reference U.S. Appl. No. 14/720,674 (12 pages).
U.S. Office Action dated Sep. 21, 2017, issued in cross-reference U.S. Appl. No. 14/842,632 (6 pages).

(56) References Cited

OTHER PUBLICATIONS

U.S. Advisory Action dated Oct. 3, 2017, issued in cross-reference U.S. Appl. No. 14/839,642 (4 pages).
Heemken et al., "Comparison of ASE and SFE with Soxhlet, Sonication, and Methanolic Saponification Extractions for the Determination of Organic Micropollutants in Marine Particulate Matter," Analytical Chemistry, vol. 69, No. 11, Jun. 1, 1997, pp. 2171-2180.
U.S. Office Action dated Nov. 3, 2017, for U.S. Appl. No. 14/754,346 (8 pages).
KIPO Notice of Allowance dated Oct. 27, 2017, corresponding to Korean Patent Application No. 10-2014-0188905 (3 pages).
KIPO Office Action dated Nov. 13, 2017, for corresponding Korean Patent Application No. 10-2015-0109028 (6 pages).
U.S. Notice of Allowance dated Nov. 20, 2017, issued in U.S. Appl. No. 14/720,674 (8 pages).
U.S. Office Action dated Nov. 22, 2017, issued in U.S. Appl. No. 14/839,642 (10 pages).
KIPO Office Action dated Aug. 21, 2017, corresponding to Korean Patent Application No. 10-2015-0079441 (9 pages).
Chinese Search Report from the SIPO Office Action dated Dec. 19, 2017, corresponding to Chinese Patent Application No. 201510452174.6 (2 pgs).
Chinese Office Action dated Jan. 2, 2018, corresponding to Chinese Patent Application No. 201510574210.6 (7 pages).
Korean Notice of Allowance dated Jan. 17, 2018, for corresponding Korean Patent Application No. 10-2014-0184766 (3 pages).
Korean Notice of Allowance dated Feb. 2, 2018, corresponding to Korean Patent Application No. 10-2014-0184768 (3 pages).
U.S. Office Action dated Feb. 7, 2018, issued in U.S. Appl. No. 14/754,346 (9 pages).
U.S. Notice of Allowance dated Mar. 7, 2018, issued in U.S. Appl. No. 14/720,674 (9 pages).
U.S. Final Office Action dated May 15, 2018, issued in U.S. Appl. No. 14/839,642 (11 pages).

\* cited by examiner

COMPOSITION FOR FORMING SILICA LAYER, METHOD FOR MANUFACTURING SILICA LAYER AND SILICA LAYER

CROSS-REFERENCE TO RELATED APPLICATION

This application claims priority to and the benefit of Korean Patent Application No. 10-2015-0109028, filed in the Korean Intellectual Property Office on Jul. 31, 2015, the entire content of which is incorporated herein by reference.

BACKGROUND

1. Field

This disclosure relates to a composition for forming a silica layer, a method of manufacturing a silica layer, and a silica layer manufactured according to the method.

2. Description of the Related Art

With the development of semiconductor technology, researches on a semiconductor memory cell with high integration and a high speed have been made in order to increase integration in a smaller semiconductor chip and improve performance. However, as the semiconductor requires high integration and a space between wires becomes narrower, a RC delay, a cross-talk, deterioration of a response speed and/or the like may occur and thus, causes a problem in terms of a semiconductor interconnection. In order to solve this problem, appropriate separation among devices may be needed. Accordingly, the appropriate separation among devices is performed by widely using a silica layer formed of a silicon-containing material as an interlayer insulating layer of a semiconductor device, a planarization layer, a passivation film, an insulation layer among devices and the like. The silica layer is used as a protective layer, an insulation layer and the like for a display device and the like as well as the semiconductor device. The silica layer is formed by coating a silicon-containing material in a set or predetermined region of a device and curing it, but defects on a surface of the silica layer may have an unfavorable effect on a yield and reliability of the device.

SUMMARY

An aspect of an embodiment is directed toward a composition for forming a silica layer capable of providing a layer having small defects and a uniform thickness.

Another aspect of an embodiment is directed toward a method of manufacturing a silica layer using the composition for forming a silica layer.

Yet another aspect of an embodiment is directed toward a silica layer having small defects and a uniform thickness.

Still another aspect of an embodiment is directed toward an electronic device including the silica layer.

According to one embodiment, a composition for forming a silica layer includes a silicon-containing polymer and a mixed solvent including at least two solvents, wherein the mixed solvent has a surface tension of about 5 mN/m to about 35 mN/m at a temperature of about 25° C.

The mixed solvent may have a surface tension of about 15 mN/m to about 35 mN/m at a temperature of about 25° C.

The mixed solvent may include at least two selected from benzene, toluene, xylene, ethylbenzene, diethylbenzene, trimethylbenzene, triethylbenzene, cyclohexane, cyclohexene, decahydro naphthalene, dipentene, pentane, hexane, heptane, octane, nonane, decane, ethyl cyclohexane, methyl cyclohexane, cyclohexane, cyclohexene, p-menthane, dipropylether, dibutylether, anisole, butyl acetate, amyl acetate, methylisobutylketone, paramethylanisole, tetramethyl benzene, and a combination thereof.

The silicon-containing polymer may include polysilazane, polysiloxazane or a combination thereof.

The silicon-containing polymer may have a weight average molecular weight of about 1,000 g/mol to about 160,000 g/mol.

The silicon-containing polymer may be included in an amount of about 0.1 wt % to about 30 wt % based on the total amount of the composition for forming a silica layer.

According to another embodiment, a method of manufacturing a silica layer includes coating the composition for forming a silica layer on a substrate, drying the substrate coated with the composition for forming a silica layer to produce a resultant, and curing the resultant at a temperature of about 150° C. or greater under an atmosphere including an inert gas to manufacture a silica layer.

The composition for forming a silica layer may be coated utilizing a spin-on coating method.

According to yet another embodiment, a silica layer provided according to the method is provided.

According to still another embodiment, an electronic device including the silica layer is provided.

In one or more embodiments, a composition for forming a silica layer is capable of providing a silica layer having small defects and a uniform thickness. Here, in one embodiment, when the composition includes the above described mixed solvent, the composition is capable of forming a silica layer with small defects and uniform thickness.

DETAILED DESCRIPTION

Exemplary embodiments of the present invention will hereinafter be described in more detail, and may be easily performed by those who have common knowledge in the related art. However, this disclosure may be embodied in many different forms and is not construed as limited to the exemplary embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening element(s) may also be present. In contrast, when an element is referred to as being "directly on" another element, there are no intervening elements present.

As used herein, when a definition is not otherwise provided, the term 'substituted' refers to one substituted with (other than by hydrogen) a substituent (on a compound) selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, phosphoric acid or a salt thereof, alkyl group, a C2 to C16 alkenyl group, a C2 to C16 alkynyl group, aryl group, a C7 to C13 arylalkyl group, a C1 to C4 oxyalkyl group, a C1 to C20 heteroalkyl group, a C3 to C20 heteroarylalkyl group, a cycloalkyl group, a C3 to C15 cycloalkenyl group, a C6 to C15 cycloalkynyl group, a heterocycloalkyl group, and a combination thereof.

As used herein, when a definition is not otherwise provided, the term 'hetero' refers to one including 1 to 3 heteroatoms selected from N, O, S, and P.

In addition, in the specification, the mark "*" refers to where something is connected with the same or different atom or Chemical Formula.

Hereinafter, a composition for forming a silica layer according to one embodiment of the present invention is described.

A composition for forming a silica layer according to one embodiment of the present invention includes a silicon-containing polymer and a mixed solvent including at least two solvents.

First of all, the mixed solvent is described.

The mixed solvent includes two different kinds of solvents and has a surface tension of about 5 mN/m to about 35 mN/m at a temperature of about 25° C. and in one embodiment, of about 15 mN/m to about 35 mN/m at a temperature of about 25° C. The surface tension of the mixed solvent may be measured under the following conditions.

Conditions for Measuring Surface Tension
Measurement device: Force Tensiometer-K11
Measurement temperature: 25° C.
Measurement Standard: ASTM D 1331

The composition for forming a silica layer according to one embodiment may not only reduce generation of a defect but also secure thickness uniformity of a film by using the mixed solvent including at least two kinds of solvents for dissolving a solid and mixing the solvents to satisfy the surface tension range of the mixed solvent.

Non-limiting examples of the solvent may include at least two selected from benzene, toluene, xylene, ethylbenzene, diethylbenzene, trimethylbenzene, triethylbenzene, cyclohexane, cyclohexene, decahydro naphthalene, dipentene, pentane, hexane, heptane, octane, nonane, decane, ethyl cyclohexane, methyl cyclohexane, cyclohexane, cyclohexene, p-menthane, dipropylether, dibutylether, anisole, butyl acetate, amyl acetate, methylisobutylketone, paramethylanisole, tetramethyl benzene, and a combination thereof, but is not limited thereto.

The silicon-containing polymer is a polymer including silicon (Si) in the structure, for example, polysilazane, polysiloxazane, or a combination thereof.

Specifically, the silicon-containing polymer of the composition for forming a silica layer may include polysilazane including a moiety represented by Chemical Formula 1.

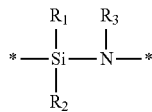

Chemical Formula 1

In Chemical Formula 1, R1 to R3 are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof.

The "*" indicates a linking point.

The polysilazane may be prepared by the various suitable methods, for example, it can be prepared by reacting halosilane with ammonia.

The silicon-containing polymer of the composition for forming a silica layer may be (or include) polysilazane including a moiety represented by Chemical Formula 2 in addition to (or in the alternative to) the moiety represented by Chemical Formula 1.

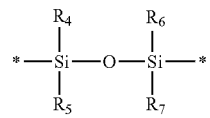

Chemical Formula 2

In Chemical Formula 2, R4 to R7 are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof.

The "*" indicates a linking point.

In this way, when the composition further includes a moiety represented by Chemical Formula 2, polysiloxazane prepared according to the embodiment includes a silicon-oxygen-silicon (Si—O—Si) bond moiety other than a silicon-nitrogen (Si—N) bond moiety in its structure, and thus the silicon-oxygen-silicon (Si—O—Si) bond moiety may relieve (weaken) stress during curing by a heat treatment and reduce contraction.

Furthermore, the hydrogenated polysilazane and/or polysiloxazane of the composition for forming a silica layer may include a moiety represented by Chemical Formula 3 at the terminal end.

 *—SiH₃

Chemical Formula 3

The moiety represented by Chemical Formula 3 is a structure where the terminal end is capped with hydrogen, and may be included in an amount of about 15 to about 35 wt % based on the total amount of the Si—H bond of the polysilazane and/or polysiloxazane structure. When the moiety of Chemical Formula 3 is included in the polysilazane and/or polysiloxazane structure within the range, a SiH₃ moiety is prevented from being scattered into SiR₄ while an oxidation reaction sufficiently occurs during the heat treatment, and a crack in a filler pattern may be prevented.

For example, the silicon-containing polymer may have a weight average molecular weight of about 1,000 g/mol to about 160,000 g/mol, for example about 3,000 g/mol to about 120,000 g/mol.

The silicon-containing polymer may be included in an amount of about 0.1 wt % to about 50 wt %, for example about 0.1 wt % to about 30 wt % based on the total amount of the composition for forming a silica layer. When it is included within the range, it may maintain an appropriate viscosity and bring about a flat and uniform layer with no gap (void).

The composition for forming a silica layer may further include a thermal acid generator (TAG).

The thermal acid generator may be an additive to improve a developing property of the composition for forming a silica layer (e.g., to improve a developing property of the polysilazane and/or polysiloxazane). Thus allowing the polymers of the composition to be developed at a relatively low temperature.

The thermal acid generator may include any compound without particular limit, if it generates acid (H+) by heat. In particular, it may include a compound activated at a temperature of 90° C. or higher and generating sufficient acid and also, having low volatility.

The thermal acid generator may be, for example selected from nitrobenzyl tosylate, nitrobenzyl benzenesulfonate, phenol sulfonate, and a combination thereof.

The thermal acid generator may be included in an amount of about 0.01 wt % to about 25 wt % based on the total amount of the composition for forming a silica layer. Within the range, the polymer may be developed at a low temperature and simultaneously, have improved coating properties.

The composition for forming a silica layer may further include a surfactant.

The surfactant is not particularly limited, and may be, for example a non-ionic surfactant such as polyoxyethylene alkyl ethers (such as polyoxyethylene lauryl ether, polyoxyethylene stearyl ether, polyoxyethylene cetyl ether, polyoxyethylene oleyl ether, and/or the like), polyoxyethylene alkylallyl ethers (such as polyoxyethylenenonyl phenol ether, and/or the like), polyoxyethylene-polyoxypropylene block copolymers, polyoxyethylene sorbitan fatty acid ester (such as sorbitan monolaurate, sorbitan monopalmitate, sorbitan monostearate, sorbitan monoleate, polyoxyethylene sorbitan monostearate, polyoxyethylene sorbitan trioleate, polyoxyethylene sorbitan tristearate, and/or the like); a fluorine-based surfactant of EFTOP EF301, EF303, EF352 (Tochem Products Co., Ltd.), MEGAFACE F171, F173 (Dainippon Ink & Chem., Inc.), FLUORAD FC430, FC431 (Sumitomo 3M), Asahi guardAG710, Surflon S-382, SC101, SC102, SC103, SC104, SC105, SC106 (Asahi Glass Co., Ltd.), and/or the like; and/or other silicone-based surfactant (such as an organosiloxane polymer KP341 (Shin-Etsu Chemical Co., Ltd.), and/or the like).

The surfactant may be included in an amount of about 0.001 to about 10 wt % based on the total amount of the composition for forming a silica layer. Within the range, dispersion of a solution and simultaneously, uniform thickness of a layer may be improved.

The composition for forming a silica layer may be a solution obtained by dissolving the silicon-containing polymer and the components in the mixed solvent.

According to another embodiment of the present invention, a method for manufacturing a silica layer includes coating the composition for forming a silica layer on the substrate; drying the substrate coated with the composition for forming a silica layer to produce a resultant; and curing the resultant under an inert gas atmosphere at (with) a temperature of greater than or equal to about 150° C.

For example, the composition for forming a silica layer may be coated utilizing a solution coating (application) process such as a spin-on coating method, slit coating, and/or inkjet printing.

The substrate may be, for example a device substrate (such as a semiconductor, a liquid crystal and/or the like), but is not limited thereto.

According to another embodiment of the present invention, a silica layer manufactured according to the method is provided. The silica layer may be, for example an insulation layer, a separation membrane, or a hard coating layer, but is not limited thereto.

According to another embodiment of the present invention, an electronic device including the silica based layer manufactured according to the method is provided. The electronic device may be, for example a display device, or semiconductor device such as LCD or LED.

The following examples illustrate embodiments of the present invention in more detail. However, these embodiments are exemplary, and the present disclosure is not limited thereto.

Preparation of Composition for Forming a Silica Layer

Synthesis Example 1

Dry nitrogen was used to substitute the inside of a 2 L reactor equipped with a stirrer (agitator) and a temperature controller. Then, 2.0 g of pure water was injected into 1,500 g of dry pyridine and sufficiently mixed therewith, and the mixture was put in the reactor and kept warm at a temperature of 5° C. Subsequently, 100 g of dichlorosilane was slowly added thereto over one hour, and then, 70 g of ammonia was slowly injected thereto over 3 hours, while the obtained mixture was stirred (agitated). Then, dry nitrogen was injected into the reactor for 30 minutes, and the ammonia remaining in the reactor was removed.

The obtained white slurry-phased product was filtered with a 1 μm polytetrafluoroethylene (Teflon) filter under a dry nitrogen atmosphere, thereby obtaining 1,000 g of a filtered solution. Then, 1,000 g of dry xylene was added thereto, and the mixture was adjusted to have a solid concentration of 20% by repeating a solvent substitution from the pyridine to xylene for three times in total with a rotary evaporator and then, filtered with a polytetrafluoroethylene (Teflon) filter having a pore size of 0.03 μm.

Finally, the obtained product was adjusted to have a solid concentration by repeating a solvent substitution from the xylene to di-n-butylether for three times in total with a rotary evaporator, while the dry di-n-butylether containing moisture of less than or equal to 5 ppm was added thereto and then, filtered with a polytetrafluoroethylene (Teflon) filter having a pore size of 0.03 μm, thereby obtaining a polysilazane polymer having a weight average molecular weight (Mw) of 7,000. The weight average molecular weight was measured by using GPC; HPLC Pump 1515, RI Detector 2414 (Waters Co.) and Column: LF804 (Shodex).

Example 1

A mixed solvent was prepared by mixing 20 g of xylene and 20 g of decalin.

When the surface tension of the mixed solvent was measured at a temperature of 25° C. by using Force Tensiometer-K11, the result was 29.51 mN/m.

Then, 8 g of the polysilazane polymer according to Synthesis Example 1 was dissolved in the mixed solvent, and the solution was filtered, thereby preparing a composition for forming a silica layer.

Example 2

A composition for forming a silica layer was prepared according to the same method as Example 1 except for using a mixed solvent of 20 g of diethylbenzene and 20 g of paramethyl anisole (a surface tension at 25° C.: 31.57 mN/m) instead of the mixed solvent of Example 1.

Example 3

A composition for forming a silica layer was prepared according to the same method as Example 1 except for using a mixed solvent of 20 g of tetramethylbenzene and 20 g of paramethyl anisole (a surface tension at 25° C.: 30.75 mN/m) instead of the mixed solvent of Example 1.

Comparative Example 1

A composition for forming a silica layer was prepared according to the same method as Example 1 except for using a mixed solvent of 20 g of anisole and 20 g of ethylhexylether (a surface tension at 25° C.: 35.30 mN/m) instead of the mixed solvent of Example 1.

Comparative Example 2

A composition for forming a silica layer was prepared according to the same method as Example 1 except for using 40 g of Xylene (a surface tension at 25° C.: 29.02 mN/m) alone instead of the mixed solvent of Example 1.

Evaluation 1: Film Surface Characteristics

Each composition for forming a silica layer according to Examples 1 to 3 and Comparative Examples 1 to 2 was spin-on coated on a patterned silicon wafer having a diameter of 8 inches and baked at a temperature of 150° C. for 130 seconds, thereby forming a thin film.

Then, the thin films were wet-oxidized at a temperature of 350° C. for 1 hour under an oxygen and aqueous vapor atmosphere by using a Pyrogenic furnace and dry-etched to a depth of 100 nm on the surface by using CF4 gas, thereby preparing the samples.

Subsequently, an AIT-XP defect tester was used to read coordinates of defects on the surface of the samples, the defects were reviewed and classified into a hole defect and a particle defect with CD-SEM, and the number of the total hole defects and the number of hole defects each having a diameter of greater than or equal to 175 nm were calculated.

The surface characteristics (%) of the film were obtained by Equation 1.

Film surface characteristics (%)=the number of hole defects each having a diameter of greater than or equal to 175 nm/the number of total hole defects          Equation 1

(the number of total defects=the number of total hole defects+the number of total particle defects)

Evaluation 2: Film Thickness Uniformity

Each composition for forming a silica layer according to Examples 1 to 3 and Comparative Examples 1 to 2 was spin-on coated on a silicon wafer having a diameter of 8 inches and baked at 150° C. for 130 seconds, thereby forming thin films.

Then, an Atlas thickness-measuring equipment was used to measure a thickness at 51 points spread in a distance of 6 mm, and their average thickness, a maximum thickness, and a minimum thickness were used to evaluate thickness uniformity of the films through Equation 2.

Film thickness uniformity (%)=[(maximum thickness−minimum thickness)/(2*average thickness)]*100          Equation 2

The results of Evaluations 1 and 2 were provided in Table 1.

TABLE 1

| | Solvent | Surface tension (mN/m) (at 25° C.) | Film thickness uniformity (%) | Film surface characteristics (%) |
|---|---|---|---|---|
| Example 1 | Xylene + Decalin | 29.51 | 0.6 | 3 |
| Example 2 | Diethyl benzene + p-Methyl anisole | 31.57 | 0.9 | 9 |
| Example 3 | Tetramethyl benzene + p-Methyl anisole | 30.75 | 1.05 | 11 |
| Comparative Example 1 | Anisole + Ethyl hexyl ether | 35.30 | 1.6 | 45 |
| Comparative Example 2 | Xylene | 29.02 | 1.05 | 21 |

Referring to Table 1, each composition for forming a silica layer according to Examples 1 to 3 showed a smaller number of hole defects than that of each composition for forming a silica layer according to Comparative Examples 1 to 2 and thus showing excellent thickness uniformity as well as satisfactory surface characteristics.

As used herein, the term "and/or" includes any and all combinations of one or more of the associated listed items. Expressions such as "at least one of," "at least one selected from," "at least two of," or "at least two selected from," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration. As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the term "substantially," "about," and similar terms are used as terms of approximation and not as terms of degree, and are intended to account for the inherent deviations in measured or calculated values that would be recognized by those of ordinary skill in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A composition for forming a silica layer comprising:
a silicon-containing polymer; and
a mixed solvent consisting of at least two selected from benzene, toluene, ethylbenzene, diethylbenzene, trimethylbenzene, triethylbenzene, cyclohexane, cyclohexene, dipentene, pentane, hexane, heptane, octane, nonane, decane, ethyl cyclohexane, methyl cyclohexane, cyclohexane, cyclohexene, p-menthane, dipropylether, dibutylether, butyl acetate, amyl acetate, methylisobutylketone, paramethylanisole, and tetramethyl benzene,
wherein the mixed solvent has a surface tension of about 29.51 mN/m to about 35 mN/m at a temperature of about 25° C.

2. The composition for forming a silica layer of claim 1, wherein the silicon-containing polymer comprises polysilazane, polysiloxazane, or a combination thereof.

3. The composition for forming a silica layer of claim 1, wherein the silicon-containing polymer has a weight average molecular weight of about 1,000 g/mol to about 160,000 g/mol.

4. The composition for forming a silica layer of claim 1, wherein the silicon-containing polymer is included in an amount of about 0.1 wt % to about 30 wt % based on the total amount of the composition for forming a silica layer.

5. A method of manufacturing a silica layer, the method comprising
coating a composition for forming a silica layer on a substrate, the composition comprising:
a silicon-containing polymer; and
a mixed solvent consisting of at least two selected from benzene, toluene, xylene, ethylbenzene, diethylbenzene, trimethylbenzene, triethylbenzene, cyclohexane, cyclohexene, dipentene, pentane, hexane, heptane, octane, nonane, decane, ethyl cyclohexane, methyl cyclohexane, cyclohexane, cyclohexene, p-menthane, dipropylether, dibutylether, anisole, butyl acetate, amyl acetate, methylisobutylketone, paramethylanisole, and tetramethyl benzene,
wherein the mixed solvent has a surface tension of about 29.51 mN/m to about 35 mN/m at a temperature of about 25° C.;
drying the substrate coated with the composition to produce a resultant; and
curing the resultant at a temperature of about 150° C. or greater under an atmosphere including an inert gas to manufacture a silica layer.

6. The method of claim 5, wherein the composition for forming a silica layer is coated utilizing a spin-on coating method.

7. The method of claim 5, wherein the silicon-containing polymer comprises polysilazane, polysiloxazane, or a combination thereof.

8. The method of claim 5, wherein the silicon-containing polymer has a weight average molecular weight of about 1,000 g/mol to about 160,000 g/mol.

9. The method of claim 5, wherein the silicon-containing polymer is included in an amount of about 0.1 wt % to about 30 wt % based on the total amount of the composition for forming a silica layer.

10. A silica layer provided according to the method of claim 5.

11. An electronic device comprising the silica layer of claim 10.

12. An electronic device comprising a silica layer, the silica layer being a derivative of the composition of claim 1.

* * * * *